May 19, 1970  G. ROBERTS  3,512,406
TENSION METER

Filed Sept. 12, 1966  2 Sheets-Sheet 1

May 19, 1970  G. ROBERTS  3,512,406
TENSION METER

Filed Sept. 12, 1966  2 Sheets-Sheet 2

United States Patent Office 3,512,406
Patented May 19, 1970

3,512,406
TENSION METER
Geoffrey Roberts, 11 Moor Park Drive, Addingham, Ilkley, Yorkshire, England
Filed Sept. 12, 1966, Ser. No. 578,815
Int. Cl. G01l 5/10
U.S. Cl. 73—144                                   7 Claims

ABSTRACT OF THE DISCLOSURE

The present invention relates to means for measuring the tension of a sheet of stretched flexible material, stretched tape, a band of threads, or the like, and more particularly relates to a tension meter comprising in combination a tension sensing unit for contacting a flexible material whose tension is to be measured and a tension indicating or recording unit from which the tension may be read.

BACKGROUND OF THE INVENTION

The textile industry has become increasingly aware of the need to be able to measure warp tension, for instance, during weaving, and several attempts have been made to achieve such measurement. The importance of successfully achieving measurement is due to the significant effect of warp tension on many aspects of weaving behaviour and to the difficulty of controlling the behaviour when warp tension cannot be measured.

The object of the present invention is the provision of simple, robust and easy to use means for measuring the tension of a band of threads or flexible material more particularly but not exclusively intended for use on a running loom whereby a pointer giving a steady reading of the aggregate tension of a group of warp threads may be easily read and the tension per end readily calculated from the said reading and the number of threads in the band. Another object is to provide a small measuring head for the said means or instrument which may be separable from an indicating unit of the instrument whereby such unit can be carried by an operator for easy reading irrespective of the position of the measuring head on the loom, the latter being adapted for ready insertion between the back rail and the lease rods or warp stop motion or between the warp beam and the back rail of looms. According to this invention there is provided a tension meter comprising in combination a tension sensing unit for contacting a flexible material whose tension is to be measured and a tension-indicating or recording unit from which the tension may be read.

Preferably the tension sensing unit of the tension meter comprises a frame including a platform and an end wall extending from the platform, a pair of mutually spaced parallel longitudinal guides extending from said end wall alongside the platform. A longitudinal deflectable element having a free end and a fixed end extending from the end wall and situated relative to said guides such that the surface of the element which is contacted by the flexible material, is staggered in relation to the edges of the guides also contacted by the flexible material, at least one strain gauge located at the fixed end of the deflectable element to sense the deflection in said element when a band of flexible material is threaded between said guides and said element.

Preferably also the tension sensing unit has a pair of resistance strain gauges bonded to the tension-sensing element and the tension indicating unit comprises a four armed Wheatstone bridge circiut having a known resistance in the first arm, a known resistance in the second arm, a resistance strain gauge in the third arm and a further resistance strain gauge in the fourth arm, a source of E.M.F. connected across the bridge input and current measuring means connected between the junction of the first and second arms and the junction of the third and fourth arms, from which current measuring means, the bridge output is directly readable as the tension in the flexible material.

A movable stop may be provided on the frame so as to deflect the cantilevered rod to set up a precise strain for the purpose of calibrating recording equipment.

One embodiment and its application to a loom will now be described by way of illustration, with reference to the drawings in which.

Figure 1:
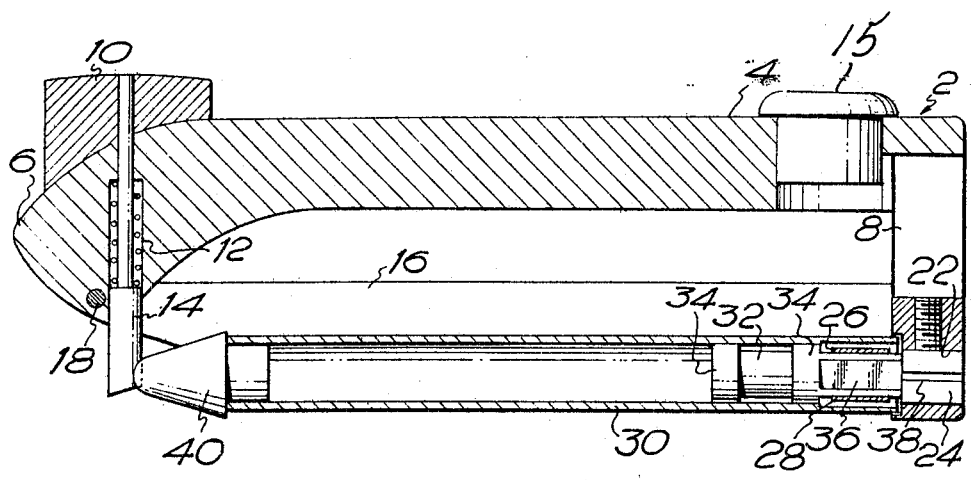
FIG. 1 is a sectional side elevation of the tension sensing unit.
Figure 2:
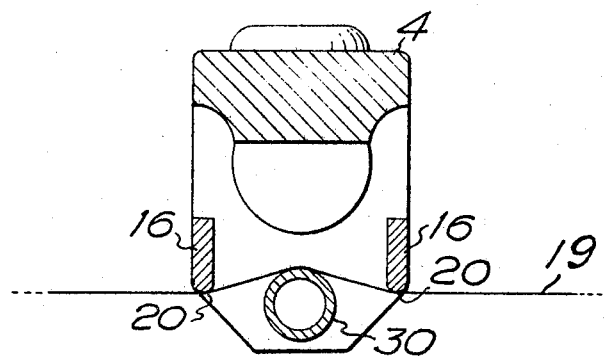
FIG. 2 is a sectional end elevation of the same unit.

Referring to FIGS. 1 and 2, the tension sensing unit will be described first.

The frame 2 of the unit comprises a elongated wooden platform 4 seven inches long and one and a half inches vide. The front limb or nose 6 of the frame is integral with the wooden platform 4 but the rear of the frame is a steel plate 8 screwed to the platform.

On the upper surface of the nose of the frame there is a shaped knob 10. There is a vertical bore 12 in the frame nose and a spring loaded retaining pin 14 housed therein which is retractable by rotating the profiled knob 10 so as to produce a cam-like lift to the pin. At the rear end of the platform 4 there is an aperture which houses a plug socket 15.

The end wall 8 is of relatively thick U-section. The end wall and the frame nose 6 are connected by a pair of mutually spaced metal strips 16 projecting from the outer edges of the end wall and connected to either side of the frame nose 6 by a transverse metal pin 18.

The strips 16 are half an inch deep and act as guides for a band of warp threads 19 of selected width.

The strips 16 are of chromium plated steel and are set one and a half inches apart. They have rounded lower edges 20, to minimise the friction offered to the threads when the latter are threaded around the lower edges in use and to prevent abrasion of the threads of the sheet of threads. The end wall has a bore 22 situated between the strips. The upper edge of the tube 30 is slightly above a line joining the lower edges of the guides. The bore 22 provides a mounting for the tension-sensing assembly consisting of a short shaft 24 carrying a pair of strain gauges 26, 28 and a tubular extension to the shaft 30.

The shaft 24 has a cylindrical end stub and a circular groove 32 spaced therefrom to make two spaced integral collars 34. The cylindrical stub is a push fit into the bore 22 in the end wall 8 and is locked therein by a grub screw. The stub constitutes the fixed end of the assembly. Between the stub and the first collar 34 is a square section 36. The strain gauges 26, 28 each have a gauge factor of about 120 and are of the type incorporating semi-conductor material. The gauges are bonded to the upper and lower horizontal flats 36, so that downward deflection of the tubular extension 30 elongates the material of the upper gauge 26 and compresses the material of the lower gauge 28, consequently changing their electrical resistance. Electrical conduits lead from the gauges through grooves 38 in the cylindrical stub to the plug socket 15.

The extension of the shaft comprises a half inch O.D. steel tube 30, slightly over five inches long. The tube is a press fit over the twin collars 34, so that the surface of the tube which is contacted by the warp threads 19 is staggered by ⅛" relative to the lower edges of the guides 16. The tube 30 terminates in a cone-shaped plastic cap 40 adjacent the retaining pin.

The cap base is of large diameter than the tube 30 so that once the sleeve has been pushed under a band of warp threads, they cannot slip off. The tip of the cap 40 is clear of the pin 14 when the latter is extended but isolates the selected threads from the remaining warp sheet.

Figure 3:
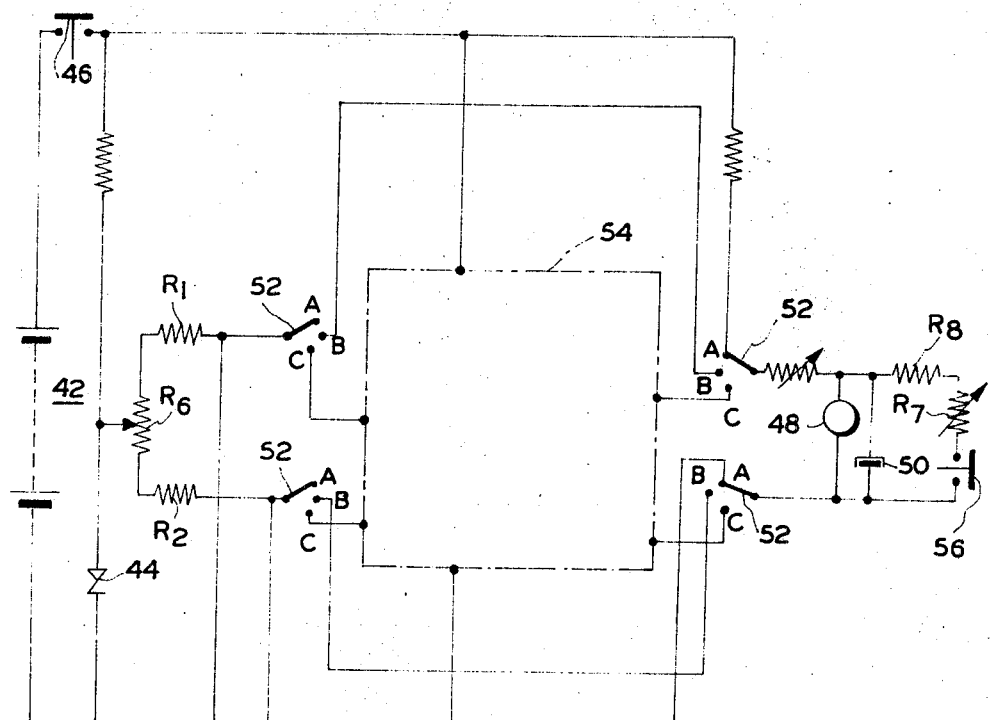
FIG. 3 is a circuit diagram of the tension recording unit.

The tension indicating unit is now described with reference to FIG. 3.

The circuit comprises a Wheatstone bridge network. Two arms of the bridge each contain fixed resistors R1 and R2 of 680 ohms. The opposite two arms contain the resistors R3, R4 each of 350 ohms constituted by the two portions of semi-conductor material forming the strain gauges 26, 28.

A potential difference is applied to the bridge circuit by a power circuit which includes a dry battery type PP9, 42 in series with a resistor R5 of 120 ohms, a push button switch 46 and a diode 44 type OAZ–203 to stabilise the supply to the circuit. The power circuit is connected to the bridge circuit in parallel through a small variable resistor R5 of 50 ohms.

A microammeter 48 directly calibrated in units of tension with full scale readings of 25 kilograms and 50 kilograms connected in parallel with a damping condenser 50 of 1000 microfarads capacity. R7 and R8 are in circuit when reading 0–50 kg. (F.S.D.) and are switched out by 56 when reading 0–25 kg. (F.S.D.) The microammeter 48 is connectable through two pairs of four pole switches 52, (1) in parallel with the power circuit with the switches in position A (under zero tension) to check that the E.M.F. of the battery is adequate.
(2) in parallel with the bridge circuit with the switches in position B to record the imbalance of the bridge under warp tension.
(3) in parallel with a transistorised peak reading voltmeter adaptor circuit indicated at 54 again when the sensing unit is under warp tension in the position C. In practice the individual warp threads undergo tension changes according to the movements of the looms and the latter peak-reading circuit 54 enables the aggregate of the highest tension of the selected warp threads, to be recorded. The adaptor circuit 54 is of known type.

All the circuitry with the exception of the resistances constituted by the strain gauges is housed within a separate portable pack.

The pack comprises a box with a neck strap and the box has a control panel which carries the scale and pointer of the microammeter, a selector knob for changing the position of the four pole switches 52 to A, B or C and two normally open press button switches. One switch 46 is to close the power circuit when position A, B or C is selected. The other switch 56 introduces resistances R7, R8 of up to 2000 ohms in parallel with the microammeter 48 thereby halving the sensitivity and requiring the sacle value to be halved to obtain a true tension reading.

The preferred method of selecting values representative of the warp sheet tension of a loom by using the embodiment is as follows:

The meter needle is zeroed. The selector knob is used to obtain position A, both buttons 46, 56 are depressed and a full scale deflection to 50 kg. will reveal that the battery E.M.F. is adequate.

Then position B is selected when with no load the depression of both buttons 46, 56 should give a zero reading. If not the circuit zero is set by adjusting R6.

A five inch band of warp threads is selected either by counting at the heald shafts or by using the frame of the sensing unit against the uniformly spaced ends on the back rail of the loom. The ends immediately adjacent the selected ones are moved to the left and right isolating the selected band without disturbing its uniformity. The protector pin 14 is raised and the conical tip 40 of the steel tube 30 is passed beneath the band while the metal strips are guided above the selected band, as shown in FIG. 2.

The threads or ends being measured are then arranged evenly along the steel tube 30 so that the latter suffers an evenly distributed downwardly deflecting force. The deflection at the free end is small, of the order of one thirtieth to one fortieth of an inch under high tensions.

As soon as the button 46 is depressed a tension reading will be obtained but the loom is allowed to run for about a minute allowing the sensing unit to travel with the yarn before a reading is noted. If the reading is less than 25 kg. the other button 56 is depressed and the reading halved.

If a peak tension reading is desired the selector knob is turned to obtain position C and the same reading procedure followed. The sensing unit is then removed and the procedure can be repeated with five inch bands selected from other areas. Values of tension per end or thread are obtained simply as follows.

$$\frac{\text{Meter reading kg.} \times 1000}{5 \times \text{ends per inch}} = \text{grams/end}$$

We have found that the above embodiment, when used with yarns in the range R99 Tex/2 to R32 Tex/2 or finer, the accuracy of the instrument is within ±5% at full scale deflection. For thicker yarns corrections to give true average tensions are required.

It is apparent from the foregoing description that the tension meter of the present invention is adapted to measure the mean aggregate tension of a band of threads. The threads during weaving are naturally evenly distributed at the point where the tension meter is utilized, and this even distribution is maintained during measurement of the tension. The measuring element is of known length and accordingly the number of ends is known within close limits of accuracy. The aggregate tension of a group of warp threads is read and the tension per end then readily calculated in accordance with the aforementioned formula.

Because the instrument is of light weight it can very quickly be applied to yarns or removed therefrom for use on other looms or machines, or the instrument may be left in situ on a loom or machine, the amount of stretch and increased tension caused to warp threads or to flexible material on insertion of the instrument being minimal and disappearing entirely after a number of preliminary picks.

Figure 4:
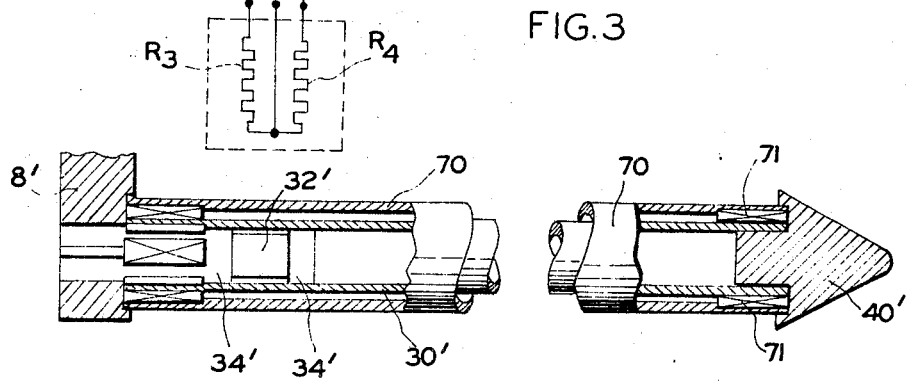
FIG. 4 is an illustration of a modified form of the invention.

Referring now to FIG. 4 of the drawings, a modified form of the invention is illustrated. Portions of the structure similar to that previously described have been given the same reference numerals primed. This modification is constructed for use as a stationary continuously recording head, and the deflectable element includes a sleeve portion 70 mounted on anti-friction bearings 71 supported by tube 30' which is, in turn, supported by the end wall 8'.

Figure 5:
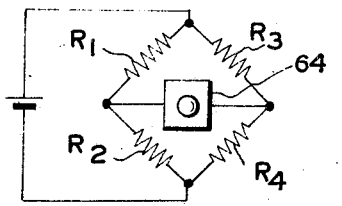
FIG. 5 is a schematic diagram of a tension-sensing unit arranged to control the warp tensioning mechanism of a loom.

Referring lastly to FIG. 5, the conduits leading from the sensing unit can be coupled to an external recorder or oscillograph 64 in order that either continuous damped or undamped permanent records or displays of the tension being measured can be obtained.

The distance by which the tube 30 is offset relative to the strip edge 20 is chosen to limit the increase in length of the sheet 19 when threaded, to an acceptable degree while maintaining sufficient deflecting force to give reasonable sensitivity. When the sensing head is constructed for use as a stationary continuously recording head, those parts of the head which contact the sheet may be modified and provided with frictionless bearings.

Although the use of two strain gauges has been described with the consequent advantages of temperature compensation, and greater sensitivity one strain gauge would work but not so well and four gauges would be preferable even if costly.

Although it has been previously mentioned herein that instruments according to the invention are particularly applicable to looms for weaving it must be understood that the instrument could be employed on any flexible material in any suitable machine or process. Nor need the measuring head and indicating unit be separate or separable, the said parts being capable of being employed either together or separately as a fixture or fixtures on machines. If desired means may be associated with the instrument for transporting the latter or for remote use thereof.

What is claimed is:

1. A tension meter for measuring the mean aggregate tension of a band of threads comprising in combination a tension sensing unit for contacting a band of threads in a flexible material whose tension is to be measured and a tension indicating unit from which the tension may be read, said tension sensing unit comprising a frame including a platform and an end wall extending from the platform, a pair of spaced longitudinal guides extending from said end wall alongside said platform, a longitudinally extending deflectable element having a free end and a fixed end, said fixed end being supported by said wall, the deflectable element being situated such that the surface of the element which is contacted by the flexible material is staggered in relation to the edges of said guides which are also contacted by the flexible material, the edges of said guides and the surface of the element contacted by the flexible material being elongated in a longitudinal direction and disposed substantially parallel with one another so that a band of individual threads of a piece of flexible material are adapted to be received by the meter and in operative contact with the edges of the guides and said surface of the element, at least one strain gauge disposed at the fixed end of the deflectable element to sense deflection in said element under the influence of a band of threads in engagement therewith, said strain gauge being operatively connected with said tension indicating unit.

2. Apparatus as defined in claim 1 wherein said deflectable element comprises a cantilevered rod having a cone-shaped cap at its free end of greater diameter than remainder of the deflectable element for preventing selected threads from sliding off the free end of the deflectable element when in use.

3. Apparatus as defined in claim 2 including a movable retaining pin supported by the end of said platform adjacent said cone-shaped cap for isolating unwanted threads from selected threads.

4. Apparatus as defined in claim 1 including a pair of wire resistance strain gauges disposed at the fixed end of said deflectable element, said tension indicating unit comprising a four armed Wheatstone bridge circuit having a known resistance in the first arm, a known resistance in the second arm, the strain gauges of said pair respectively in the third arm and fourth arm, a source of E.M.F. connected across the bridge input, and current measuring means connected between the junction of the first and second arms and the junction of the third and fourth arms, the bridge output being directly readable on said current measuring means.

5. Apparatus as defined in claim 4 wherein the current measuring means comprises a microammeter and a capacitor connectable in parallel with the microammeter to damp the fluctuations in tension readings.

6. Apparatus as defined in claim 4 wherein the current measuring means comprises a cathode ray oscilloscope.

7. Apparatus as defined in claim 1 wherein said deflectable element includes a sleeve rotatably supported by anti-fraction bearing means.

References Cited

UNITED STATES PATENTS

| 2,159,969 | 5/1939 | Furst | 73—144 |
|---|---|---|---|
| 2,661,623 | 12/1953 | Brink | 73—144 |
| 3,260,106 | 7/1966 | Hull et al. | 73—144 |

FOREIGN PATENTS

| 715,559 | 9/1954 | Great Britain. |
|---|---|---|
| 1,038,637 | 8/1966 | Great Britain. |
| 153,797 | 10/1963 | U.S.S.R. |

CHARLES A. RUEHL, Primary Examiner